US008914277B1

(12) United States Patent
Liu

(10) Patent No.: US 8,914,277 B1
(45) Date of Patent: Dec. 16, 2014

(54) SPEECH AND LANGUAGE TRANSLATION OF AN UTTERANCE

(75) Inventor: Ding Liu, Lowell, MA (US)

(73) Assignee: Nuance Communications, Inc., Burlington, MA (US)

( * ) Notice: Subject to any disclaimer, the term of this patent is extended or adjusted under 35 U.S.C. 154(b) by 333 days.

(21) Appl. No.: 13/237,510

(22) Filed: Sep. 20, 2011

(51) Int. Cl.
*G10L 15/20* (2006.01)

(52) U.S. Cl.
USPC .......... 704/4; 704/2; 704/9; 704/10; 704/235; 704/240; 704/251; 704/256; 704/260; 707/703; 707/711

(58) Field of Classification Search
CPC ................................. G10L 15/20; G10L 21/02
USPC ............... 704/1–10, 235, 240, 246, 251, 256, 704/260, 265, 277; 707/703, 711
See application file for complete search history.

(56) References Cited

U.S. PATENT DOCUMENTS

| | | | | | |
|---|---|---|---|---|---|
| 5,418,717 | A | * | 5/1995 | Su et al. | 704/9 |
| 5,848,389 | A | * | 12/1998 | Asano et al. | 704/239 |
| 5,930,746 | A | * | 7/1999 | Ting | 704/9 |
| 6,108,620 | A | * | 8/2000 | Richardson et al. | 704/9 |
| 6,233,544 | B1 | * | 5/2001 | Alshawi | 704/2 |
| 6,442,524 | B1 | * | 8/2002 | Ecker et al. | 704/277 |
| 6,839,667 | B2 | * | 1/2005 | Reich | 704/240 |
| 6,871,174 | B1 | * | 3/2005 | Dolan et al. | 704/9 |
| 6,877,001 | B2 | * | 4/2005 | Wolf et al. | 707/711 |
| 7,200,550 | B2 | * | 4/2007 | Menezes et al. | 704/10 |
| 7,249,012 | B2 | * | 7/2007 | Moore | 704/4 |
| 7,403,890 | B2 | * | 7/2008 | Roushar | 704/9 |
| 7,437,291 | B1 | * | 10/2008 | Stewart et al. | 704/251 |
| 7,873,508 | B2 | * | 1/2011 | Chino et al. | 704/2 |
| 7,917,350 | B2 | * | 3/2011 | Mori et al. | 704/2 |
| 7,983,903 | B2 | * | 7/2011 | Gao | 704/10 |
| 8,175,864 | B1 | * | 5/2012 | Dubiner | 704/2 |
| 8,185,375 | B1 | * | 5/2012 | Kumar et al. | 704/4 |
| 8,204,739 | B2 | * | 6/2012 | Waibel et al. | 704/10 |
| 8,209,163 | B2 | * | 6/2012 | Suzuki et al. | 704/2 |
| 8,250,046 | B2 | * | 8/2012 | Heymans et al. | 707/703 |
| 8,352,264 | B2 | * | 1/2013 | White et al. | 704/255 |
| 8,407,039 | B2 | * | 3/2013 | Kim et al. | 704/2 |
| 8,407,041 | B2 | * | 3/2013 | Deng et al. | 704/2 |
| 2002/0133340 | A1 | * | 9/2002 | Basson et al. | 704/235 |

OTHER PUBLICATIONS

Lambert Mathias et al., "Statiscal Phrase-Based Speech Translation", 2006, IEEE, 1-4244-0469-X/06, p. I-561-I-564.*
Benesty, Sondhi, Huang (Eds.), "Springer Handbook of Speech Processing", 2008, Springer, p. 478.*
Kishore Papineni et al., "BLEU: a Method for Automatic Evaluation of Machine Translation", 2002, ACL, pp. 311-318.*

* cited by examiner

*Primary Examiner* — Vijay B Chawan
*Assistant Examiner* — Seong-Ah A Shin
(74) *Attorney, Agent, or Firm* — Chapin IP Law, LLC

(57) ABSTRACT

According to example configurations, a speech-processing system parses an uttered sentence into segments. The speech-processing system translates each of the segments in the uttered sentence into candidate textual expressions (i.e., phrases of one or more words) in a first language. The uttered sentence can include multiple phrases or candidate textual expressions. Additionally, the speech-processing system translates each of the candidate textual expressions into candidate textual phrases in a second language. Based at least in part on a product of confidence values associated with the candidate textual expressions in the first language and confidence values associated with the candidate textual phrases in the second language, the speech-processing system produces a confidence metric for each of the candidate textual phrases in the second language. The confidence metric can indicate degree to which the candidate textual phrase in the second language is an accurate translation of a respective segment in the utterance.

8 Claims, 11 Drawing Sheets

| CANDIDATE TEXT PHRASE IN LANG. #1 | CONFIDENCE VALUE | | CANDIDATE TEXT PHRASE IN LANG. #2 | CONFIDENCE VALUE |
|---|---|---|---|---|
| PHRASE 140-1 | CV 10 | | PHRASE A1 | CV 20 |
| PHRASE 140-2 | CV 11 | | PHRASE B | CV 21 |
| PHRASE 140-3 | CV 12 | | PHRASE A2 | CV 22 |
| PHRASE 140-4 | CV 13 | | PHRASE C | CV 23 |
| PHRASE 140-5 | CV 14 | | PHRASE D | CV 24 |
| PHRASE 140-6 | CV 15 | | PHRASE E | CV 25 |
| PHRASE 140-7 | CV 16 | | PHRASE F1 | CV 26 |
| | | | PHRASE G | CV 27 |
| | | | PHRASE F2 | CV 28 |
| | | | PHRASE H | CV 29 |
| | | | PHRASE J | CV 2A |
| | | | PHRASE K | CV 2B |
| | | | PHRASE L | CV 2C |
| | | | PHRASE M | CV 2D |

CONFIDENCE VALUES 145

CONFIDENCE VALUES 155

120-1: PHRASE 140-1, PHRASE 140-2
120-2: PHRASE 140-3, PHRASE 140-4, PHRASE 140-5
120-3: PHRASE 140-6, PHRASE 140-7

FIG. 5

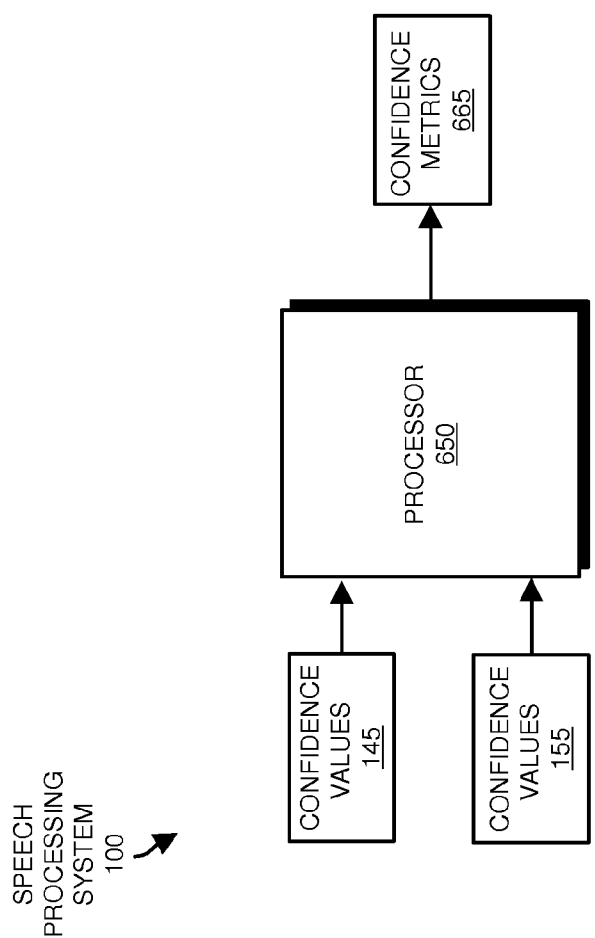

| CANDIDATE TEXT PHRASE IN LANG. #2 | CONFIDENCE METRIC |
|---|---|
| PHRASE A | CM 0 = (CV10 x CV20) + (CV11 x CV22) |
| PHRASE B | CM 1 = (CV10 x CV21) |
| PHRASE C | CM 2 = (CV11 x CV23) |
| PHRASE D | CM 3 = (CV12 x CV24) |
| PHRASE E | CM 4 = (CV12 x CV25) |
| PHRASE F | CM 5 = (CV13 x CV26) + (CV14 x CV28) |
| PHRASE G | CM 6 = (CV13 x CV27) |
| PHRASE H | CM 7 = (CV14 X CV29) |
| PHRASE J | CM8 = (CV15 x CV2A) |
| PHRASE K | CM9 = (CV15 x CV2B) |
| PHRASE L | CM10 = (CV16 x CV2C) |
| PHRASE M | CM11 = (CV16 x CV2D) |

120-1: PHRASE A, PHRASE B, PHRASE C
120-2: PHRASE D, PHRASE E, PHRASE F, PHRASE G, PHRASE H
120-3: PHRASE J, PHRASE K, PHRASE L, PHRASE M

CONFIDENCE METRICS 655

FIG. 7

SPEECH AND LANGUAGE TRANSLATION OF AN UTTERANCE

BACKGROUND

Conventional speech recognition systems are highly complex and operate by matching an acoustic signature of an utterance with acoustic signatures of words stored in a language model. As an example, according to a conventional speech recognition process, a resource such as a microphone receives and converts a received acoustic signal into an electrical signal. Typically, an A/D (analog-to-digital) converter is used to convert the electrical signal into a digital representation. A digital signal processor converts the captured electrical signal from the time domain to the frequency domain.

Generally, as another part of the speech recognition process, the digital signal processor breaks down the detected utterance into its spectral components. The amplitude or intensity of the digital signal at various frequencies and temporal locations can be compared to a language model to determine the word that was uttered.

In certain cases, it is desirable to convert a received utterance spoken in a first language into text of a second language. In such an instance, a conventional two-stage process can be deployed.

For example, a first stage of the conventional two-stage process can include a speech recognition system as discussed above. More specifically, the speech recognition system in the first stage applies a speech-to-text algorithm to convert an uttered sentence into one or more sentences of text in a first language that likely represents the utterance. Thereafter, a second stage such as a language translator stage applies a language translation algorithm to convert the text in the first language into a set of text in a second language. Converting the received utterance spoken in the first language into text of the second language can alleviate the need for the speaker from having to know multiple languages and communicate in the second language.

As mentioned, conventional translation of an uttered sentence of words in a first language can include producing many possible translations of the sentence in a second language. For example, a single uttered sentence in a first language can be converted into multiple possible textual translations in the first language. Each of the different possible textual translations of the sentence in the first language can be converted into one or more possible textual translations in the second language. In general, the most likely best translation of the uttered sentence can be selected amongst the multiple possible translations based on so-called confidence values generated for each possible translation.

BRIEF DESCRIPTION

Use of conventional techniques to convert an audio signal spoken in a first language into text of a second language suffers from deficiencies. For example, via conventional techniques, it is possible to convert a received utterance into a sentence of text in a first language. Thereafter, as mentioned, a language translator can convert the sentence into different permutations of a sentence of words in a second language. Also as mentioned, in many cases, translation of a single uttered sentence can produce many possible candidate textual translations into the first language. Each of the candidate translations of the sentence in the first language can then be translated into one or more textual translations of a second language. Accordingly, a sentence spoken in a first language can be translated into many possible translations to a second language.

Multiple occurrences of translating the uttered sentence into the same textual sentence in the second language, especially if the translations have a corresponding high confidence level, can indicate a higher likelihood that the sentence translation is the correct or best sentence translation for the utterance.

Embodiments herein deviate with respect to conventional techniques as discussed above. For example, in accordance with one embodiment, a speech-processing system parses an uttered sentence into segments. The speech-processing system translates each of the segments in the uttered sentence into candidate textual expressions (i.e., phrases of one or more words) in a first language. Additionally, the speech-processing system translates each of the candidate textual expressions into candidate textual phrases in a second language. Based at least in part on a product of confidence values associated with the candidate textual expressions in the first language and confidence values associated with the candidate textual phrases in the second language, the speech-processing system produces a confidence metric for each of the candidate textual phrases in the second language. The confidence metric can indicate a likelihood of whether the candidate textual phrase in the second language is a accurate translation of a respective segment in the utterance.

In accordance with further embodiments, the speech-processing system identifies separate translation paths in which a given segment of the uttered sentence translates into a same candidate textual phrase in the second language. In such an instance, the speech-processing system calculates the confidence metric for the given segment based on confidence values associated with the candidate textual expressions and confidence values associated with the candidate textual phrases for the separate translation paths. In one embodiment, the speech-processing system produces the confidence metrics based on a sum of products as further discussed herein.

Certain embodiments herein can include translation of an uttered sentence in accordance with N-best route integration. Such integration can significantly improve the confidence estimation for a given conversion of a portion of the utterance into a respective candidate textual phrase. As discussed above, one problem with conventional speech-processing systems is that there are typically too many different translations for a full sentence and it's very rare to find two identical translations based on two different candidate sentences produced by a speech recognition system.

In contrast to conventional methods, embodiments herein can include segmenting sentences produced by an automatic speech recognition system into smaller phrases and keeping track of their audio spans. The speech-processing system translates these smaller phrases and integrates them together based on their audio spans.

Embodiments herein are further distinguished over conventional techniques. For example, embodiments herein can include producing a phrase based lattice rather than merely a word lattice. An utterance under test can be segmented in accordance with an appropriate size to make full use of a black-box machine translation system while still allowing repetitive translations to emerge in the integration. Also, embodiments herein reduce the integration scope to the sub-sentence level (e.g. to the phrase level between the word level and the sentence level) so that translation paths leading to the same phrase translations can be practically integrated together to improve the confidence estimation.

Techniques herein are well suited for use in software and/or hardware applications implementing translation of an utterance into corresponding text. However, it should be noted that embodiments herein are not limited to use in such applications and that the techniques discussed herein are well suited for other applications as well.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any type of hardware storage medium) on which software instructions are encoded for subsequent execution. The instructions and/or program, when executed in a computerized device having a processor, cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a computer program product that includes a computer readable storage medium having instructions stored thereon for converting an utterance in a first language to corresponding text in a second language. For example, in one embodiment, the instructions, when executed by a processor of a respective computer device, cause the processor to: receive an utterance spoken in a first language; partition a spoken sentence in the utterance into multiple segments, a given segment of the multiple segments including multiple words spoken in the first language; convert the given segment of the multiple segments into multiple candidate textual phrases in a second language; and produce a confidence metric for each respective candidate textual phrase of the multiple candidate textual phrases in the second language, the confidence metric indicating a confidence that the respective candidate textual phrase is an accurate translation of the given segment of the utterance into the second language.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Nuance Communications, Inc., Burlington, Mass., USA.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 5 is an example diagram illustrating generation of confidence values associated with candidate phrases according to embodiments herein.

FIG. 6 is an example diagram illustrating generation of one or more confidence metrics according to embodiments herein.

FIG. 7 is an example diagram illustrating equations to generate confidence metrics according to embodiments herein.

DETAILED DESCRIPTION

As discussed herein, a speech-processing system parses an uttered sentence into segments. The speech-processing system translates each of the segments in the uttered sentence into candidate textual expressions (i.e., phrases of one or more words) in a first language. The uttered sentence can include multiple phrases or candidate textual expressions. Additionally, the speech-processing system translates each of the candidate textual expressions into candidate textual phrases in a second language. Based at least in part on a product of confidence values associated with the candidate textual expressions in the first language and confidence values associated with the candidate textual phrases in the second language, the speech-processing system produces a confidence metric for each of the candidate textual phrases in the second language. The confidence metric can indicate likelihood that the candidate textual phrase in the second language is an accurate translation of a respective segment in the utterance.

Figure 1:
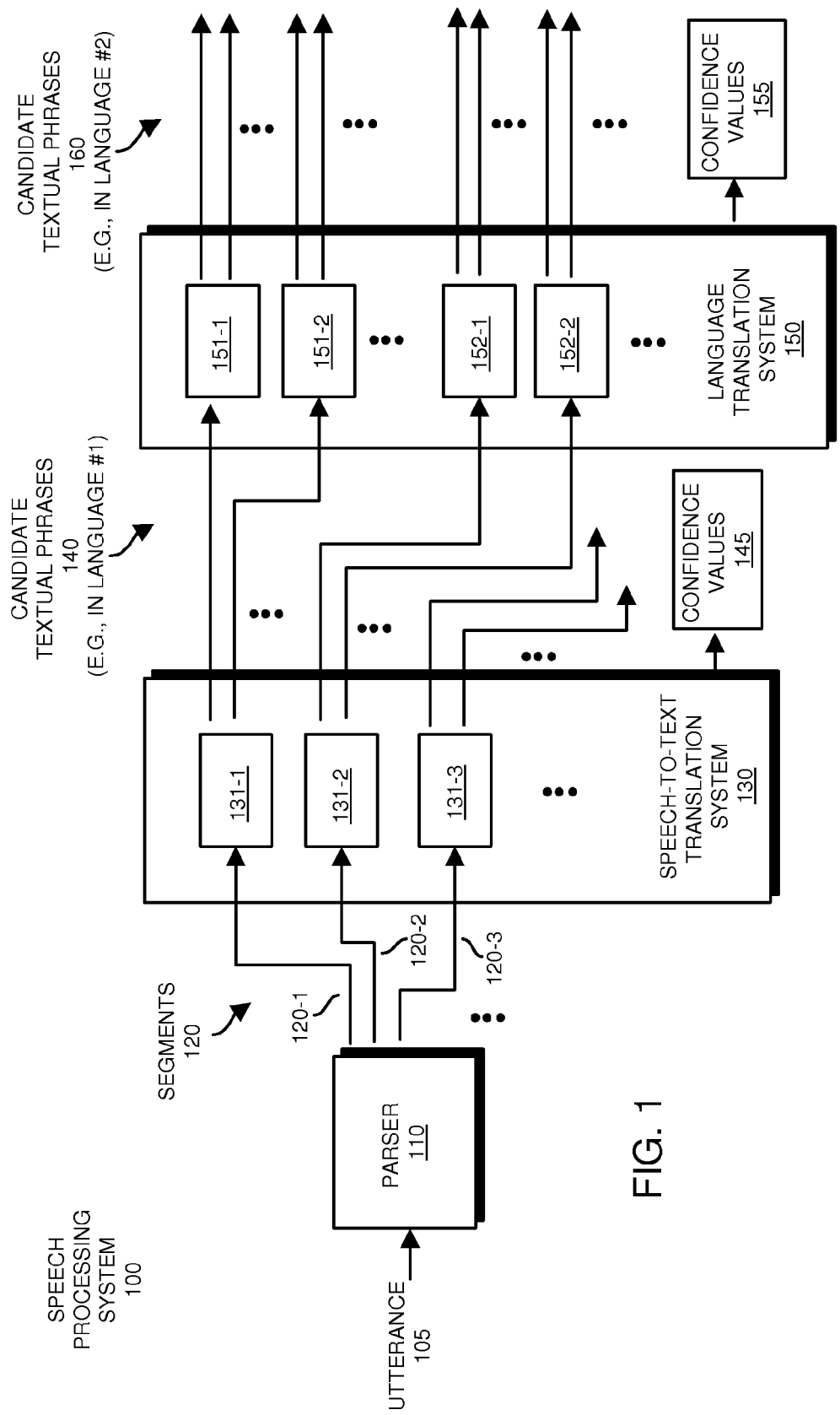
FIG. 1 is an example diagram of a speech-processing system according to embodiments herein.

FIG. 1 is an example diagram of a speech-processing system according to embodiments herein.

As shown, speech-processing system 100 includes a parser 110, a speech-to-text translation system 130, and a language translation system 150.

One embodiment herein includes receiving utterance 105 in a first spoken language and converting all or a portion of the utterance 105 into corresponding text (e.g., written words, characters, etc.) in a second language.

More specifically, in one example embodiment, speech-processing system 100 receives utterance 105. As mentioned, the utterance 105 can be an audio signal such as one or more sentences spoken in a first language.

Parser 110 receives and processes the utterance 105 into segments 120 (e.g., segment 120-1, segment 120-2, segment 120-3, and so on). Processing of the utterance 105 via parser 110 can include identifying a presence of different spoken words in the utterance 105 and producing the segments 120 depending on detected words present in the utterance 105.

Each of the segments 120 can include a phrase of one or more words spoken in the first language. A combination of the segments 120 in the utterance 105 can represent a spoken sentence or grouping of words uttered in the first language.

Speech-to-text translation system 130 receives the segments 120 of the utterance and converts the segments 120 into respective candidate textual phrases 140 (e.g., expressions, each of which includes one or more words) in the first language.

Utterance 105 can represent an uttered sentence of words. The parser 110 can produce each of one or more segments to include a phrase of one or more words in the first language but fewer than all words spoken in the sentence.

In accordance with further specific embodiments, the speech-to-text translation system 100 employs different speech-to-text processing threads 131 to produce the candidate textual phrases 140 for each segment. As an example, speech-to-text processing thread 131-1 in system 130 produces one or more candidate textual phrases for segment 120-1; speech-to-text processing thread 131-2 in system 130 produces one or more candidate textual phrases for segment 120-2; speech-to-text processing thread 131-3 in system 130 produces one or more candidate textual phrases for segment 120-3; and so on.

The speech-to-text translation system 130 produces confidence values 145 for the produced candidate textual phrases 140. As its name suggests, each of the confidence values 145 indicates a confidence that a respective candidate textual phrase is an accurate or correct translation of the corresponding segment of the utterance 105 into the respective candidate textual phrase. In other words, the confidence values 145 provide a weighting, probability, relative indication, etc., of which of one or more candidate textual phrases produced for a given segment 120-$n$ are the most accurate translation of the respective segment 120-$n$.

Language translation system 150 receives the different candidate textual phrases 140 as produced by the speech-to-text translation system 130 in the first language and translates each respective candidate textual phrase into one or more candidate textual phrases 160 in a second language. The second language is different than the first language.

In one example embodiment as shown, the speech-to-text translation system 100 employs different language translation processing threads 151 to produce the candidate textual phrases 160.

More specifically, language translation processing thread 151-1 produces one or more candidate textual phrases 160 (in the second language) for a first candidate textual phrase 140 produced by speech-to-text processing thread 131-1; language translation processing thread 151-2 produces one or more candidate textual phrases 160 (in the second language) for a second candidate textual phrase 140 produced by speech-to-text processing thread 131-1; . . . ; language translation processing thread 152-1 produces one or more candidate textual phrases 160 (in the second language) for a first candidate textual phrase 140 produced by speech-to-text processing thread 131-2; language translation processing thread 152-2 produces one or more candidate textual phrases 160 (in the second language) for a second candidate textual phrase 140 produced by speech-to-text processing thread 131-2; . . . ; and so on.

In one embodiment, the language translation system 150 produces confidence values 155 for the candidate textual phrases 160. For example, as its name suggests, each of the confidence values 155 indicate a confidence that a respective candidate textual phrase in the second language as produced by the language translation system 150 is an accurate or correct translation of the corresponding candidate textual phrase in the first language. In other words, the confidence values 155 provide a weighting or relative indication of which of one or more candidate textual phrases 160 produced for a particular candidate textual phrase 140-$n$ are the most accurate textual translation of the particular candidate textual phrase 140-$n$.

Figure 2:
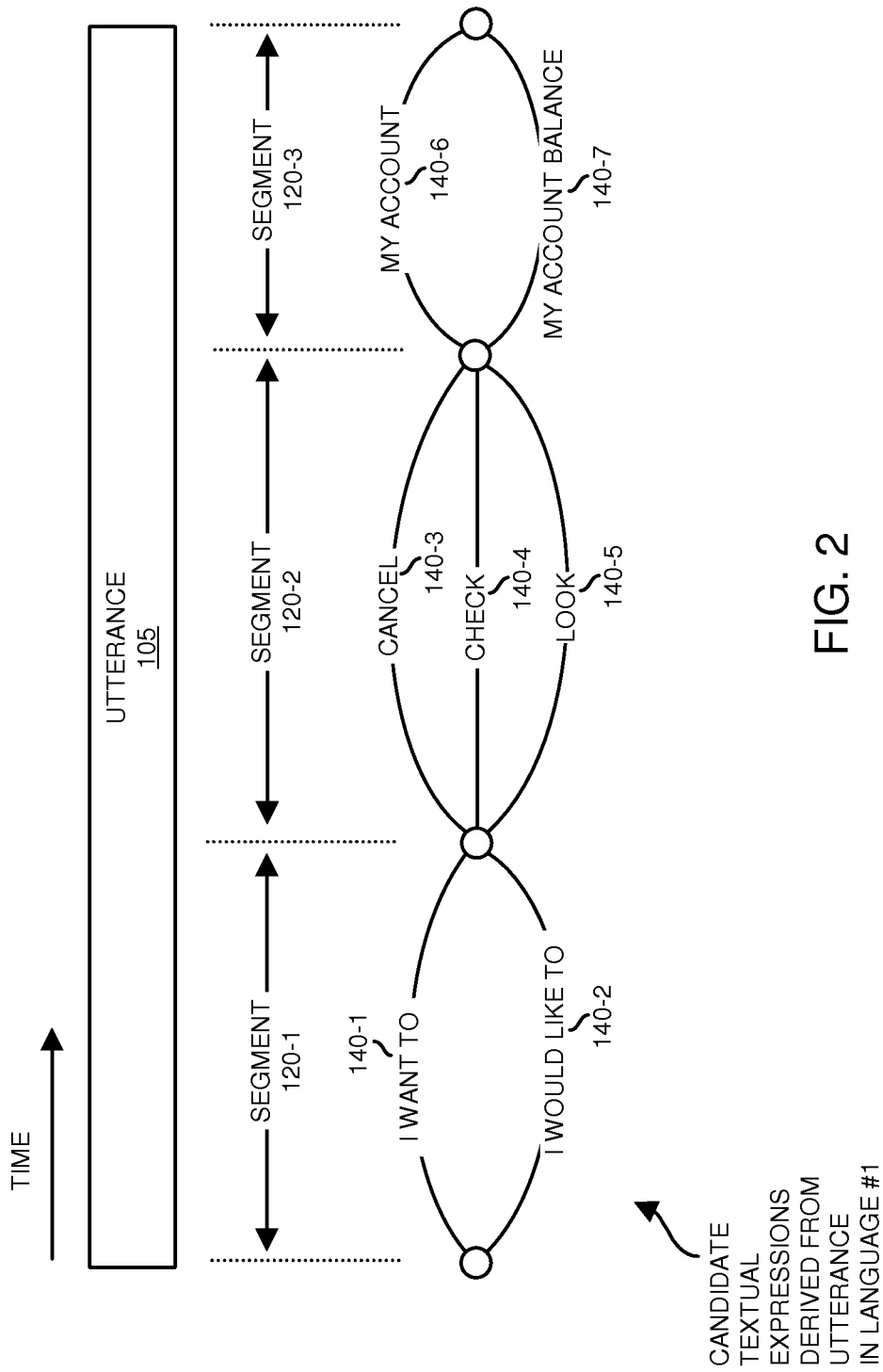
FIG. 2 is an example diagram illustrating a phrase lattice including possible translations of different segments of an utterance in a first language according to embodiments herein.

FIG. 2 is an example diagram illustrating translations of different segments of an utterance according to embodiments herein.

In this example, the parser 110 receives utterance 105 such as a sentence spoken in a first language as previously discussed. Parser 110 parses utterance 105 into segment 120-1, segment 120-2, and segment 120-3 as shown.

Parser 110 can be configured to parse the utterance 105 depending on any suitable set of rules. For example, the utterance 105 can be parsed based on detection of different types of particular types of words (in the first language). The different types of words can be used as a basis for detecting a partition between respective segments.

The speech-processing system 100 keeps track of the audio spans or phrase boundaries of the segments 120, which may vary as mentioned.

In one embodiment, the parser 110 parses the received utterance 105 into different segments 120 depending on parameters such as the language (e.g., a first language) of the utterance 105 and/or the language (e.g., a second language) into in which the utterance 105 is being converted. As an example, the parser 110 can parse the utterance 105 into different segments 120 when converting the utterance 105 from spoken English to Spanish text, as compared to converting the utterance 105 from spoken English to Chinese characters (e.g., text); and so on.

Note that the process of parsing the utterance 110 into segments 120 can be integrated with the processing performed by speech-to-text translation system 130 because the parsing of the utterance 105 or choosing the end or beginning (i.e., boundary) of a segment, as mentioned, can depend on the words detected in the utterance 105.

Subsequent to parsing or as part of the parsing process, speech-to-text processing thread 131-1 converts a first segment 120-1 of the utterance 105 (e.g., a portion of a respective audio signal) into multiple candidate phrases 140 (a.k.a., candidate textual expressions) that are possible translations of the segment 120-1 in the first language. In this example, the speech-to-text processing thread converts the first segment 120-1 of utterance 105 into the candidate phrase 140-1 (e.g., "I WANT TO") and candidate phrase 140-2 (e.g., "I WOULD LIKE TO").

Speech-to-text processing thread 131-2 additionally converts segment 120-2 of the utterance 105 into candidate phrase 140-3 (e.g., "CANCEL"), candidate phrase 140-4 (e.g., "CHECK"), and candidate phrase 140-5 (e.g., "LOOK").

Speech-to-text processing thread 131-3 converts segment 120-3 of the utterance 105 into candidate phrase 140-6 (e.g., "MY ACCOUNT") and candidate phrase 140-7 (e.g., "MY ACCOUNT BALANCE").

Accordingly, the speech-to-text translation system 130 converts different segments of the received utterance 105 into any number of different phrases or expressions in the first language.

Figure 3:
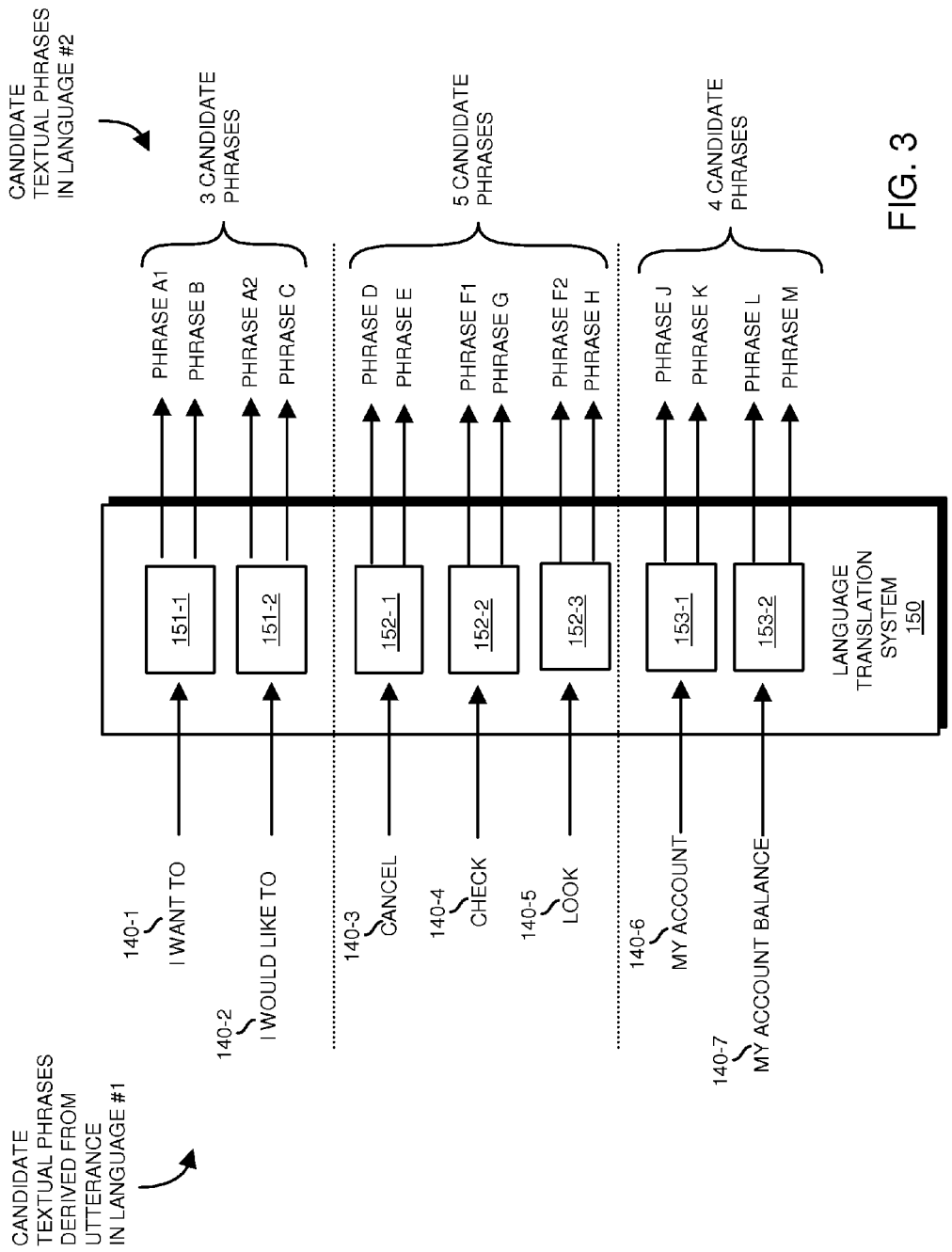
FIG. 3 is an example diagram illustrating application of a language translation system according to embodiments herein.

FIG. 3 is an example diagram illustrating application of a language translation system for converting each respective phrase in the first language into one or more phrases in a second language according to embodiments herein.

Just as there may be some degree of uncertainty associated with translating the segments into candidate textual expressions, there may be some degree of uncertainty of converting a respective phrase in a first language into a respective phrase of a second language. Thus, in one embodiment, the language translation system 150 may convert each of the different candidate phrases 140 in the first language into one or more candidate phrases 160 in the second language as well as produce confidence values 155.

In this example, the language translation processing thread 151-1 translates the candidate phrase 140-1 in the first language into phrase A1 and phrase B in the second language; the language translation processing thread 151-2 translates the candidate phrase 140-2 in the first language into phrase A2 and phrase C in the second language; and so on.

In one embodiment, the phrase A1 (e.g., first occurrence of phrase A) and phrase A2 (e.g., second occurrence of phrase A) are identical phrases including the same words, meaning that each of the different input candidate phrases in the first language (namely, candidate phrase 140-1 and candidate phrase 140-2) are translated into the same candidate phrase of the second language. However, each of candidate phrase A, candidate phrase B, and candidate phrase C are different than each other.

In furtherance of this example, the language translation processing thread 152-1 translates the candidate phrase 140-3 in the first language into phrase D and phrase E in the second language; the language translation processing thread 152-2 translates the candidate phrase 140-4 in the first language into phrase F1 (e.g., first occurrence of phrase F) and phrase G in the second language; the language translation processing thread 152-3 translates the candidate phrase 140-5 in the first language into phrase F2 (e.g., second occurrence of phrase F) and phrase H in the second language; and so on.

The language translation processing thread 153-1 translates the candidate phrase 140-6 in the first language into phrase J and phrase K in the second language; the language translation processing thread 153-2 translates the candidate phrase 140-7 in the first language into phrase L and phrase M in the second language; and so on.

Accordingly, via language translation system 150, each of the segments 120 can be translated into many different possible candidate phrases in a second language.

Figure 4:
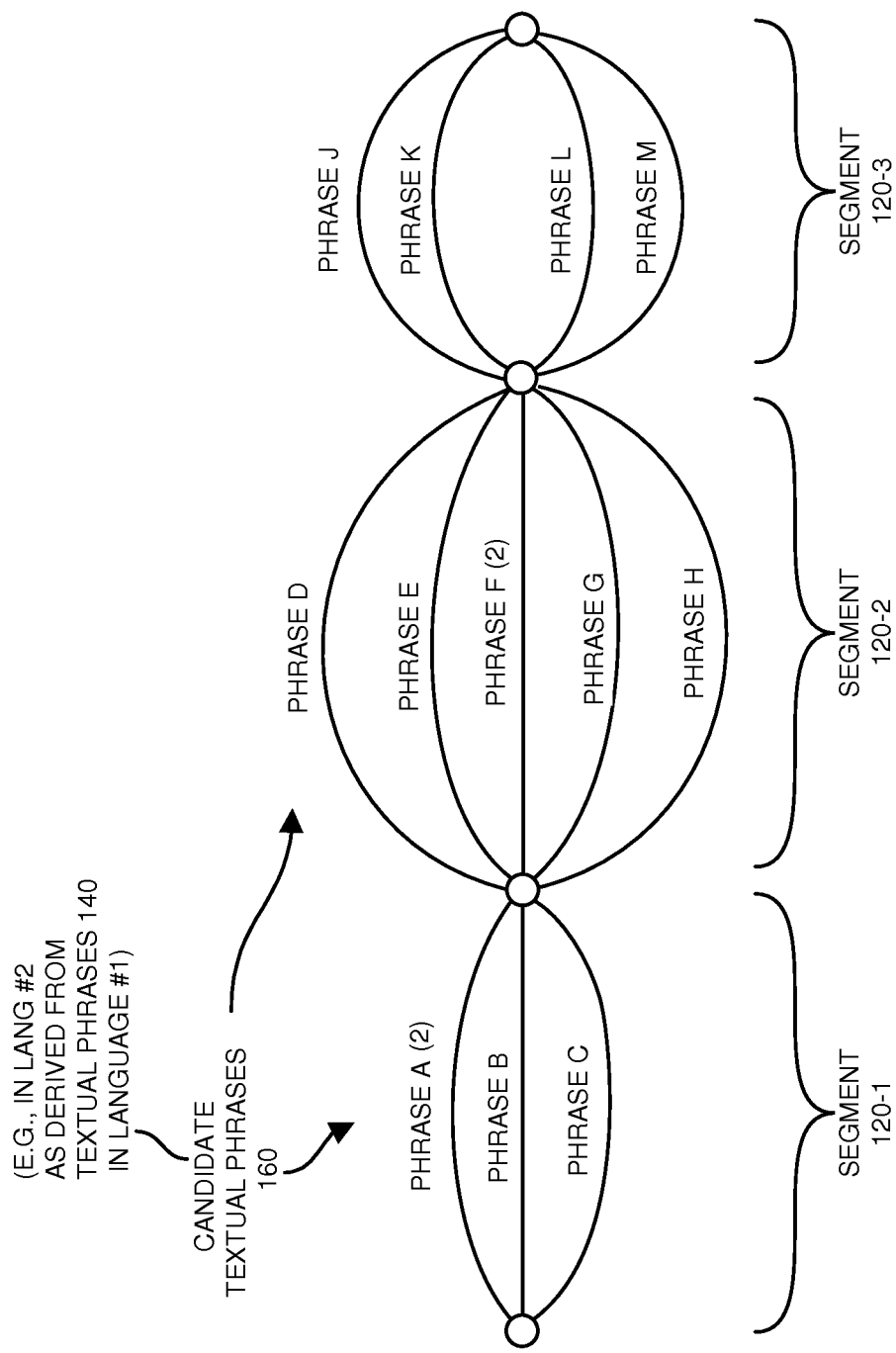
FIG. 4 is an example diagram illustrating a translation lattice of multiple candidate phrases in a spoken sentence in a second language according to embodiments herein.

FIG. 4 is a diagram illustrating an example translation lattice of candidate phrases according to embodiments herein.

As shown, speech-processing system 100 translates segment 120-1 of utterance 105 into candidate phrases A, B, and C in a manner as previously discussed. Note again that there were two occurrences of converting segment 120-1 into phrase A. That is, language translation processing thread 151-1 converts candidate phrase 140-1 for segment 120-1 into phrase A; language translation processing thread 151-2 also converts candidate phrase 140-2 for segment 120-1 into phrase A.

Speech-processing system 100 translates segment 120-2 of utterance 105 into candidate phrases D, E, F, G, and H in a manner as previously discussed. Note again that there were two occurrences of converting segment 120-2 into phrase F. That is, language translation processing thread 152-2 converts candidate phrase 140-1 for segment 120-2 into phrase F; language translation processing thread 151-3 also converts candidate phrase 140-5 for segment 120-2 into phrase F.

Speech-processing system 100 translates segment 120-3 of utterance 105 into candidate phrases J, K, L, and M in a manner as previously discussed.

FIG. 5 is an example diagram illustrating generation of confidence values according to embodiments herein. Note that the confidence values can be expressed in any suitable manner such as percentage, decimal, probability value, etc.

In one embodiment, higher magnitude confidence values can indicate a higher likelihood that the respective translation is a best translation; lower magnitude confidence values can indicate a lower likelihood that the respective translation is a best translation. Confidence values 145 indicate respective confidences that the candidate text phrases in the first language are accurate translations of the respective segment in utterance 105. Confidence values 155 indicate respective confidences that the candidate text phrases in the second language are accurate translations of the respective candidate text phrase in the first language.

As previously discussed, the speech-to-text translation system 130 generates a respective confidence value for each of the candidate phrases 140. For example, speech-to-text translation system 130 produces confidence value CV10 for phrase 140-1; speech-to-text translation system 130 produces confidence value CV11 for phrase 140-2; speech-to-text translation system 130 produces confidence value CV12 for phrase 140-3; speech-to-text translation system 130 produces confidence value CV13 for phrase 140-4; and so on.

Confidence value CV10 indicates a relative confidence or likelihood that the phrase 140-1 is a best or suitable translation of the segment 120-1 into text of a first language; confidence value CV11 indicates a relative confidence or likelihood that the phrase 140-2 is a best or suitable translation of the segment 120-1 into text of a first language.

Confidence value CV12 indicates a relative confidence or likelihood that the phrase 140-3 is a best or suitable translation of the segment 120-2 into text of a first language; confidence value CV13 indicates a relative confidence or likelihood that the phrase 140-4 is a best or suitable translation of the segment 120-2 into text of a first language; confidence value CV14 indicates a relative confidence or likelihood that the phrase 140-5 is a best or suitable translation of the segment 120-2 into text of a first language.

Confidence value CV15 indicates a relative confidence or likelihood that the phrase 140-6 is a best or suitable translation of the segment 120-3 into text of a first language; confidence value CV16 indicates a relative confidence or likelihood that the phrase 140-7 is a best or suitable translation of the segment 120-3 into text of a first language.

As previously discussed, the language translation system 150 generates a respective confidence value for each of the candidate phrases 160. For example, language translation system 160 produces confidence value CV20 for candidate phrase A1; language translation system 150 produces confidence value CV21 for candidate phrase B; language translation system 160 produces confidence value CV22 for candidate phrase A2; language translation system 150 produces confidence value CV23 for candidate phrase C; language translation system 160 produces confidence value CV24 for candidate phrase D; language translation system 150 produces confidence value CV25 for candidate phrase E; language translation system 160 produces confidence value CV26 for candidate phrase F1; language translation system 150 produces confidence value CV27 for candidate phrase G; language translation system 160 produces confidence value CV28 for candidate phrase F2; language translation system 150 produces confidence value CV29 for candidate phrase H; language translation system 160 produces confidence value CV2A for candidate phrase J; language translation system 150 produces confidence value CV2B for candidate phrase K; language translation system 160 produces confidence value CV2C for candidate phrase L; language translation system 150 produces confidence value CV2D for candidate phrase M.

Confidence value CV20 indicates a relative confidence or likelihood that the candidate phrase A1 in the second language is a best or suitable translation of the candidate phrase 140-1 in the first language; confidence value CV21 indicates a relative confidence or likelihood that the candidate phrase B in the second language is a best or suitable translation of the candidate phrase 140-1 in the first language.

Confidence value CV22 indicates a relative confidence or likelihood that the candidate phrase A2 in the second language is a best or suitable translation of the candidate phrase 140-2 in the first language; confidence value CV23 indicates a relative confidence or likelihood that the candidate phrase C in the second language is a best or suitable translation of the candidate phrase 140-2 in the first language.

Confidence value CV24 indicates a relative confidence or likelihood that the candidate phrase D in the second language is a best or suitable translation of the candidate phrase 140-3 in the first language; confidence value CV25 indicates a relative confidence or likelihood that the candidate phrase E in the second language is a best or suitable translation of the candidate phrase 140-3 in the first language.

Confidence value CV26 indicates a relative confidence or likelihood that the candidate phrase F1 in the second language is a best or suitable translation of the candidate phrase 140-4 in the first language; confidence value CV27 indicates a relative confidence or likelihood that the candidate phrase G in the second language is a best or suitable translation of the candidate phrase 140-4 in the first language.

Confidence value CV28 indicates a relative confidence or likelihood that the candidate phrase F2 in the second language is a best or suitable translation of the candidate phrase 140-5 in the first language; confidence value CV29 indicates a relative confidence or likelihood that the candidate phrase H in the second language is a best or suitable translation of the candidate phrase 140-5 in the first language.

Confidence value CV2A indicates a relative confidence or likelihood that the candidate phrase J in the second language is a best or suitable translation of the candidate phrase 140-6 in the first language; confidence value CV2B indicates a relative confidence or likelihood that the candidate phrase K in the second language is a best or suitable translation of the candidate phrase 140-6 in the first language.

Confidence value CV2C indicates a relative confidence or likelihood that the candidate phrase L in the second language is a best or suitable translation of the candidate phrase 140-7 in the first language; confidence value CV2D indicates a relative confidence or likelihood that the candidate phrase M in the second language is a best or suitable translation of the candidate phrase 140-7 in the first language.

FIG. 6 is an example diagram illustrating generation of one or more confidence metrics according to embodiments herein.

As shown, speech-processing system 100 can include processor 650. Processor 650 utilizes the confidence values 145 and confidence values 155 to generate confidence metrics 665. As further discussed in FIG. 7, each of the generated confidence metrics 665 provides an indication of whether a respective candidate phrase in the second language is a suitable or accurate translation of a respective segment of the utterance 105 spoken in the first language.

FIG. 7 is an example diagram illustrating equations to generate confidence metrics according to embodiments herein.

As shown, embodiments herein include taking into account cases in which a respective segment of the utterance 105 map or route to different candidate phrases in a first language and in which each of the different candidate phrases in the first language essentially map to the same candidate phrase in the second language. For example, mapping of a segment of the utterance 105 on different translation paths as discussed herein to the same candidate phrase in the second language indicates that the given candidate phrase is likely a better or more accurate representation of the segment of the utterance 105 in the second language. Via sum of products as shown and discussed, confidence metrics 655 take into account translations or conversion of a given segment of one or more words in a first spoken language to text of a second language.

The processor 650 produces confidence metrics 665 based on the confidence values in FIG. 5.

More specifically, confidence metric CM0 indicates a degree to which phrase A in the second language is an accurate textual representation of segment 120-1 of utterance 105 in the first language; confidence metric CM1 indicates a degree to which phrase B in the second language is an accurate textual representation of segment 120-1 of utterance 105 in the first language; and confidence metric CM2 indicates a degree to which phrase C in the second language is an accurate textual representation of segment 120-1 of utterance 105 in the first language.

Confidence metric CM3 indicates a degree to which phrase D in the second language is an accurate textual representation of segment 120-2 of utterance 105 in the first language; confidence metric CM4 indicates a degree to which phrase E in the second language is an accurate textual representation of segment 120-2 of utterance 105 in the first language; confidence metric CM5 indicates a degree to which phrase F in the second language is an accurate textual representation of segment 120-2 of utterance 105 in the first language; confidence metric CM6 indicates a degree to which phrase G in the second language is an accurate textual representation of segment 120-2 of utterance 105 in the first language; and confidence metric CM7 indicates a degree to which phrase H in the second language is an accurate textual representation of segment 120-2 of utterance 105 in the first language.

Confidence metric CM8 indicates a degree to which phrase J in the second language is an accurate textual representation of segment 120-2 of utterance 105 in the first language; confidence metric CM9 indicates a degree to which phrase K in the second language is an accurate textual representation of segment 120-2 of utterance 105 in the first language; confidence metric CM10 indicates a degree to which phrase L in the second language is an accurate textual representation of segment 120-2 of utterance 105 in the first language; and confidence metric CM11 indicates a degree to which phrase M in the second language is an accurate textual representation of segment 120-2 of utterance 105 in the first language.

Note that the confidence metrics 665 can be expressed in any suitable manner such as percentage, decimal value, probability, etc. In one embodiment, a higher magnitude confidence metric can indicate a higher likelihood that the respective overall translation (or candidate textual phrase) is an accurate translation; lower magnitude confidence values can indicate a lower likelihood that the respective overall translation is an accurate translation. Thus, each of confidence metrics 665 can indicate whether a respective candidate textual phrase 160 (to which the confidence metric pertains) as derived for a given segment of the utterance 105 is an accurate translation of the given segment.

In accordance with further embodiments, the speech-processing system produces each of the confidence metrics 655 based on a sum of products of confidence values 155 associated with the candidate textual phrases 160 in the second language as well as confidence values of translations of the given segment into candidate textual phrases 140 in the first language. FIG. 7 further illustrates how the processor 650 generates the confidence metrics using a sum of products.

More specifically, using the phrase lattice (in FIG. 2) and the textual language translation lattice (in FIG. 4), a respective segment such as segment 120-1 may map to a given phrase via a single translation path.

As a single path example, segment 120-1 maps to candidate textual phrase B on only a single path including a translation from segment 120-1 to candidate textual phrase 140-1 and from phase candidate textual phrase 140-1 to phrase B. In this instance, the processor 650 generates confidence metric CM1 based on a single term such as a product of the confidence value CV10 (for candidate textual phrase 140-1) and confidence value CV21 (for candidate textual phrase B). Confidence metric CM1 indicates a confidence that phrase B is an accurate translation of segment 120-1.

As another single path example, segment 120-1 maps to candidate textual phrase C on a single path including a translation from segment 120-1 to candidate textual phrase 140-2 and from phase candidate textual phrase 140-2 to phrase C. In this instance, the processor 650 generates confidence metric CM2 based on a single term as a product of the confidence value CV11 (for candidate textual phrase 140-2) and confidence value CV23 (for candidate textual phrase C).

In a similar manner as discussed above, the processor 650 generates a confidence metric for each single path case in which there is a single occurrence of mapping a respective segment of the utterance 105 to a particular candidate textual phrase 160.

However, there are cases in which there are multiple occurrences of mapping a segment on different paths to the same candidate textual phrase. For example, segment 120-1 maps to candidate textual phrase A on two separate and distinct translation paths. For example, a first of the two paths includes a translation from segment 120-1 to candidate textual phrase 140-1 and translation from phase candidate textual phrase 140-1 to phrase A. A second of the two paths includes a translation from segment 120-1 to candidate textual phrase 140-2 and translation from phase candidate textual phrase 140-2 to phrase A. Thus, there are two different occurrences or translation paths in which the segment 120-1 maps to the same phrase A. The occurrences of multiple paths makes phrase A a likelier candidate as an accurate translation of segment 120-1 into text of the second language.

In this instance, the processor 650 generates confidence metric CM1 based on a sum of products. That is, the processor 650 sums multiple terms including a first term and a second term (e.g., one for each path) to generate a confidence metric for the candidate textual phrase. For example, the first term is a product of the confidence value CV10 (for candidate textual phrase 140-1) and confidence value CV20 (for candidate textual phrase A1). The second term is a product of the confidence value CV11 (for candidate textual phrase 140-2) and confidence value CV22 (for candidate textual phrase A2). As shown, the processor 650 generates the confidence metric CM0 for phrase A as a sum of the first term (e.g., CV10 multiplied by CV20) and the second term (e.g., CV11 multiplied by CV22).

As another example, segment 120-2 maps to candidate textual phrase F on two distinct paths. A first of the two paths includes a translation from segment 120-2 to candidate textual phrase 140-4 and from phase candidate textual phrase 140-4 to phrase F. A second of the two paths includes a translation from segment 120-2 to candidate textual phrase 140-5 and from phase candidate textual phrase 140-5 to phrase F. Thus, there are two different occurrences or translation path in which the segment 120-2 maps to the same phrase F. The occurrences of multiple paths makes phrase F as a likelier accurate translation of segment 120-2 into a second language.

In this instance, the processor 650 generates confidence metric CM5 based on a sum of products. That is, the processor 650 sums multiple terms including a first term and a second term (e.g., one for each path) to generate a confidence metric for the candidate textual phrase. For example, the first term is a product of the confidence value CV13 (for candidate textual phrase 140-4) and confidence value CV26 (for candidate textual phrase F1). The second term is a product of the confidence value CV14 (for candidate textual phrase 140-5) and confidence value CV28 (for candidate textual phrase F2). As shown, the processor 650 generates the confidence metric CM5 for phrase F as a sum of the first term (e.g., CV13 multiplied by CV26) and the second term (e.g., CV14 multiplied by CV28).

Thus, the sum of products for generating a particular confidence metric can vary depending on the number of paths to a common candidate textual phrase. That is, the confidence metric is based on a single product if there is only one path; the confidence metric is based on the sum of a first product and a second product if there are two paths; the confidence metric is based on the sum of a first product, second product, and a third product if there are three paths; and so on.

In accordance with further embodiments, the confidence metrics 665 for candidate textual phrases in the uttered sentence can be used to identify an accurate translation of the utterance 105 in the second language. For example, in a simple application, the conversion of the utterance 105 into the second language can include identifying which of candidate textual phrases A, B, and C is the most accurate translation of segment 120-1 into the second language based on which of confidence metrics CM0, CM1, and CM2 is greatest in magnitude; the conversion of the utterance 105 or sentence into the second language can further include identifying which of candidate textual phrases D, E, F, G, and H is the most accurate translation of segment 120-2 into the second language based on which of confidence metrics CM3, CM4, CM5, CM6, and CM7 is greatest in magnitude; and the conversion of the utterance 105 into the second language can further include identifying which of candidate textual phrases J, K, L, and M is the most accurate translation of segment 120-3 into the second language based on which of confidence metrics CM8, CM9, CM10, and CM11 is greatest in magnitude.

Assume in this example that the CM0, CM6, and CM11 are the greatest in magnitude in each of the different groupings as mentioned above. In such an instance, the best translation of the overall utterance 105 such as a sentence would be a combination of candidate textual phrases A, G, and M in the second language. Thus, embodiments herein include producing confidence metrics on a "per phrase" basis for converting portions of an uttered sentence into phrases of a second language.

Accordingly, embodiments herein include identifying separate translation paths in which a given segment of the segments translates into a common candidate textual phrase in the second language and calculating the confidence metric for a candidate textual phrase in the se clang based on confidence values 145 associated with the candidate textual phrases 140 (i.e., expressions) and confidence values 155 associated with the candidate textual phrases 155 in the translation paths. For example, as discussed above, a first translation path includes converting segment 120-1 into candidate textual phrase 140-1 and converting candidate textual phrase 140-1 into candidate textual phrase A1; a second translation path includes converting segment 120-1 into candidate textual phrase 140-2 and converting candidate textual phrase 140-2 into candidate textual phrase A2. Candidate textual phrase A1 and candidate textual phrase A2 are identical phrases. Thus, segment 120-1 translates into the same result via multiple different paths.

Figure 8:
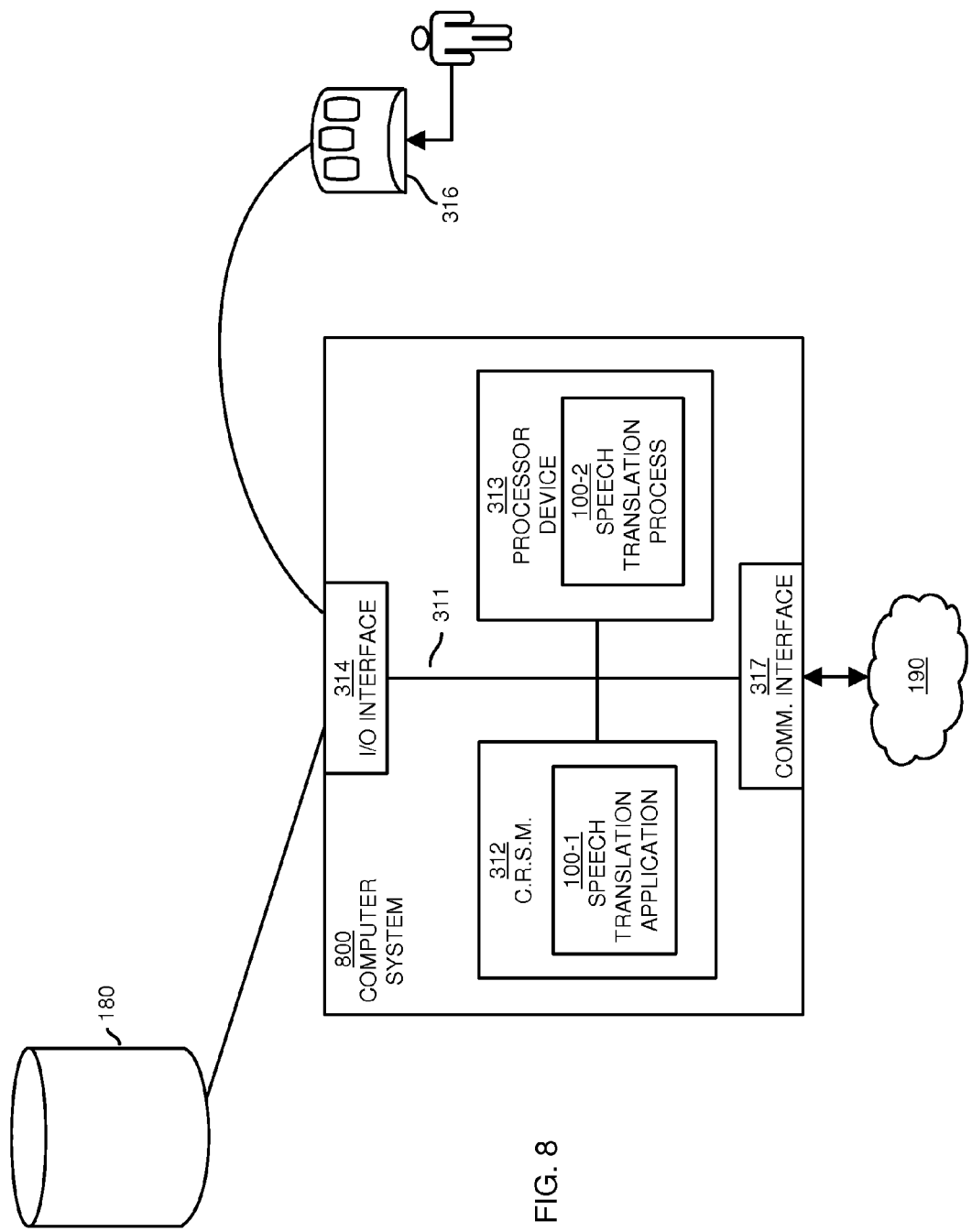
FIG. 8 is a diagram illustrating example computer architecture for implementing a speech-processing system and/or related components according to embodiments herein.

FIG. 8 is an example block diagram of a computer system for implementing a speech processing and translation application (e.g., all or a portion of functions provided by speech-processing system 100) according to embodiments herein.

Computer system 800 can include one or more computerized devices such as a personal computer, workstation, portable computing device, console, network terminal, processing device, network device, etc., operating as a server, client, etc.

Note that the following discussion provides a basic embodiment indicating how to execute functionality associated with speech-processing system 100 according to embodiments herein. However, it should be noted that the actual configuration for carrying out the operations as described herein can vary depending on a respective application.

As shown, computer system 800 of the present example includes an interconnect 311 that couples computer readable storage media 312 such as a non-transitory type of computer readable storage media in which digital information can be stored and retrieved, a processor device 313, I/O interface 314, and a communications interface 317.

I/O interface 314 provides connectivity to repository 180 and, if present, other devices such as display screen, peripheral devices 316, keyboard, computer mouse, etc.

Computer readable storage medium 312 can be any suitable device such as memory, optical storage, hard drive, floppy disk, etc. In one embodiment, the computer readable storage medium 312 is a non-transitory storage media (i.e., hardware storage media) configured to store instructions and/or data.

Communications interface 317 enables the computer system 800 and processor device 313 to communicate over a network 190 to retrieve information from remote sources and communicate with other computers. As mentioned, I/O interface 314 enables processor device 313 to retrieve respective information from repository 180.

As shown, computer readable storage media 312 can be encoded with speech translation application 100-1 (e.g., software, firmware, etc.) executed by processor device 313.

During operation of one embodiment, processor device 313 accesses computer readable storage media 312 via the use of interconnect 311 in order to launch, run, execute, interpret or otherwise perform the instructions of speech translation application 100-1 stored on computer readable storage medium 312. Speech translation application 100-1 can include appropriate instructions, language models, analyzers, etc., to carry out any or all functionality associated with the speech-processing system 100 as discussed herein.

Execution of the speech translation application 100-1 produces processing functionality such as speech translation process 100-2 in processor 313. In other words, the speech translation process 100-2 associated with processor device 313 represents one or more aspects of executing speech translation application 100-1 within or upon the processor device 313 in the computer system 800.

Those skilled in the art will understand that the computer system 800 can include other processes and/or software and hardware components, such as an operating system that controls allocation and use of hardware resources to execute speech translation application 100-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by speech-processing system 10 (e.g., speech translation application 100-1) will now be discussed via flowcharts in FIGS. 9-11. As discussed above, the speech-processing system 100 can be configured to execute the steps in the flowcharts as discussed below.

Note that there will be some overlap with respect to concepts discussed above for FIGS. 1 through 8. Also, note that the steps in the below flowcharts need not always be executed in the order shown. That is, the steps can be executed in any suitable order.

Figure 9:
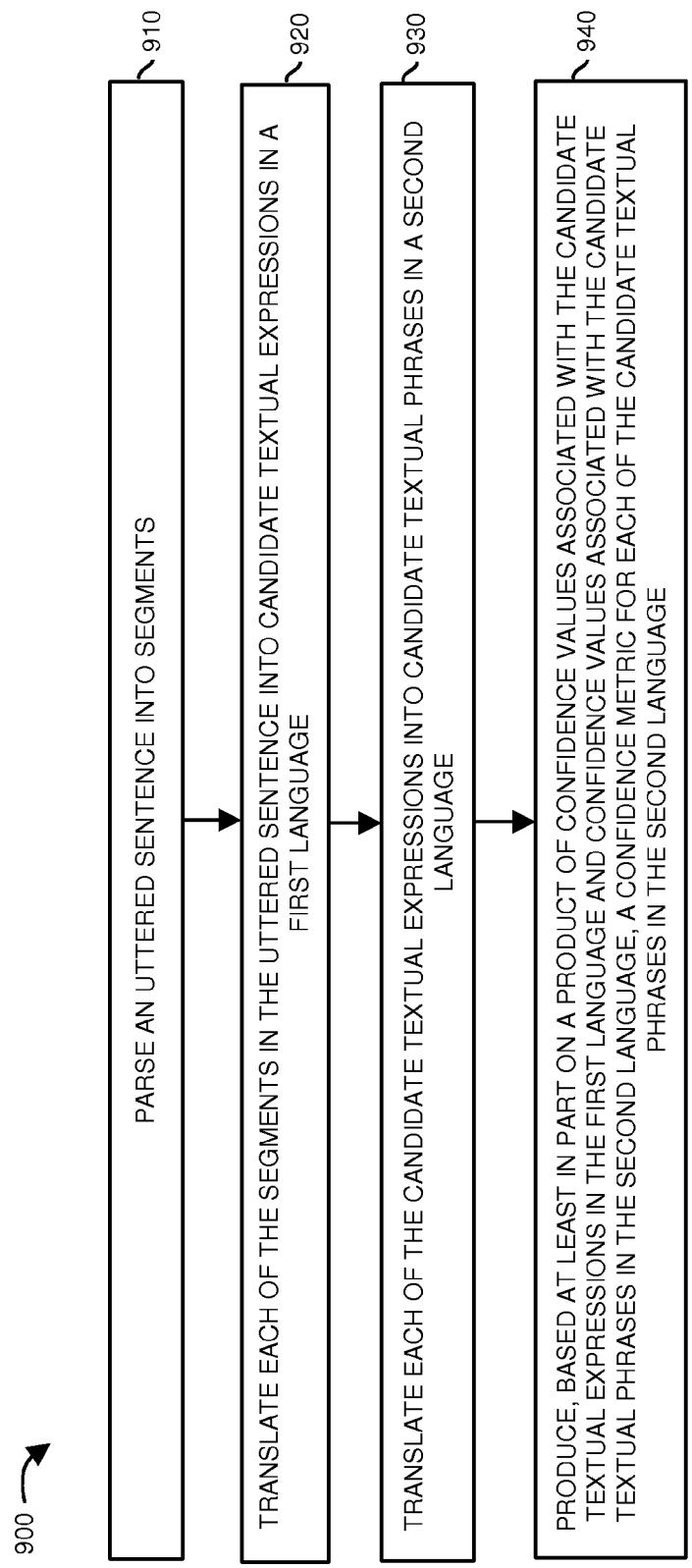
FIG. 9 is a flowchart illustrating an example method of generating a confidence metric for each of one or more candidate phrases according to embodiments herein.

FIG. 9 is a flowchart 900 illustrating a general technique of implementing multi-stage speech translation according to embodiments herein.

In step 910, the speech-processing system 100 parses an uttered sentence into segments 120.

In step 920, the speech-processing system 100 translates each of the segments in the uttered sentence into candidate textual expressions (i.e., candidate textual phrases 140) in accordance with a first language.

In step 930, the speech-processing system 100 translates each of the candidate textual expressions (i.e., candidate textual phrases 140) into candidate textual phrases in a second language.

In step 940, the speech-processing system 100 produces, based at least in part on a product of confidence values 145 associated with the candidate textual expressions 140 in the first language and confidence values 155 associated with the candidate textual phrases in the second language 155, a confidence metric for each of the candidate textual phrases in the second language.

Figure 10:
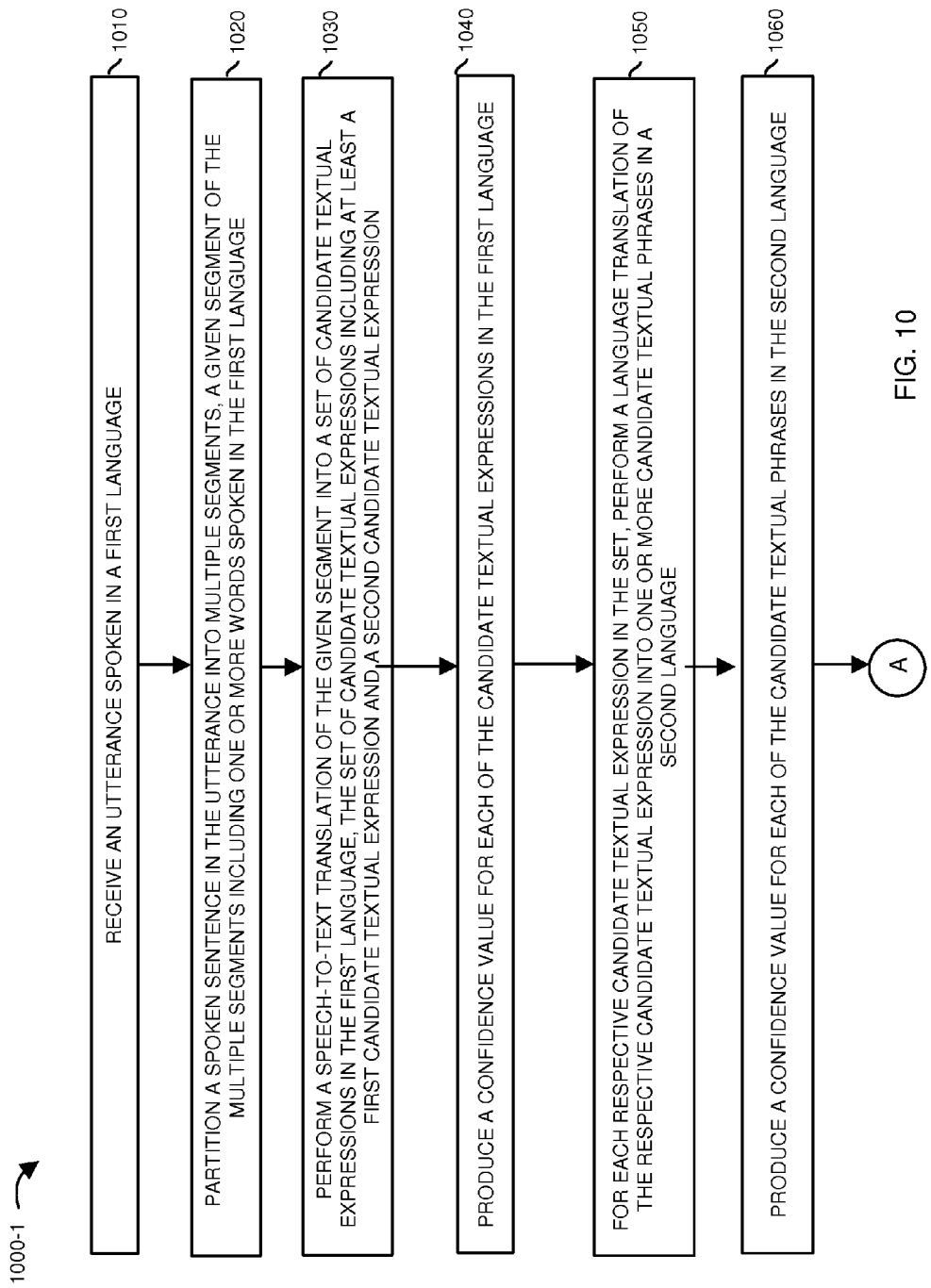
FIGS. 10 and 11 combine to form a flowchart illustrating an example method of generating each of multiple confidence metrics according to embodiments herein.
Figure 11:
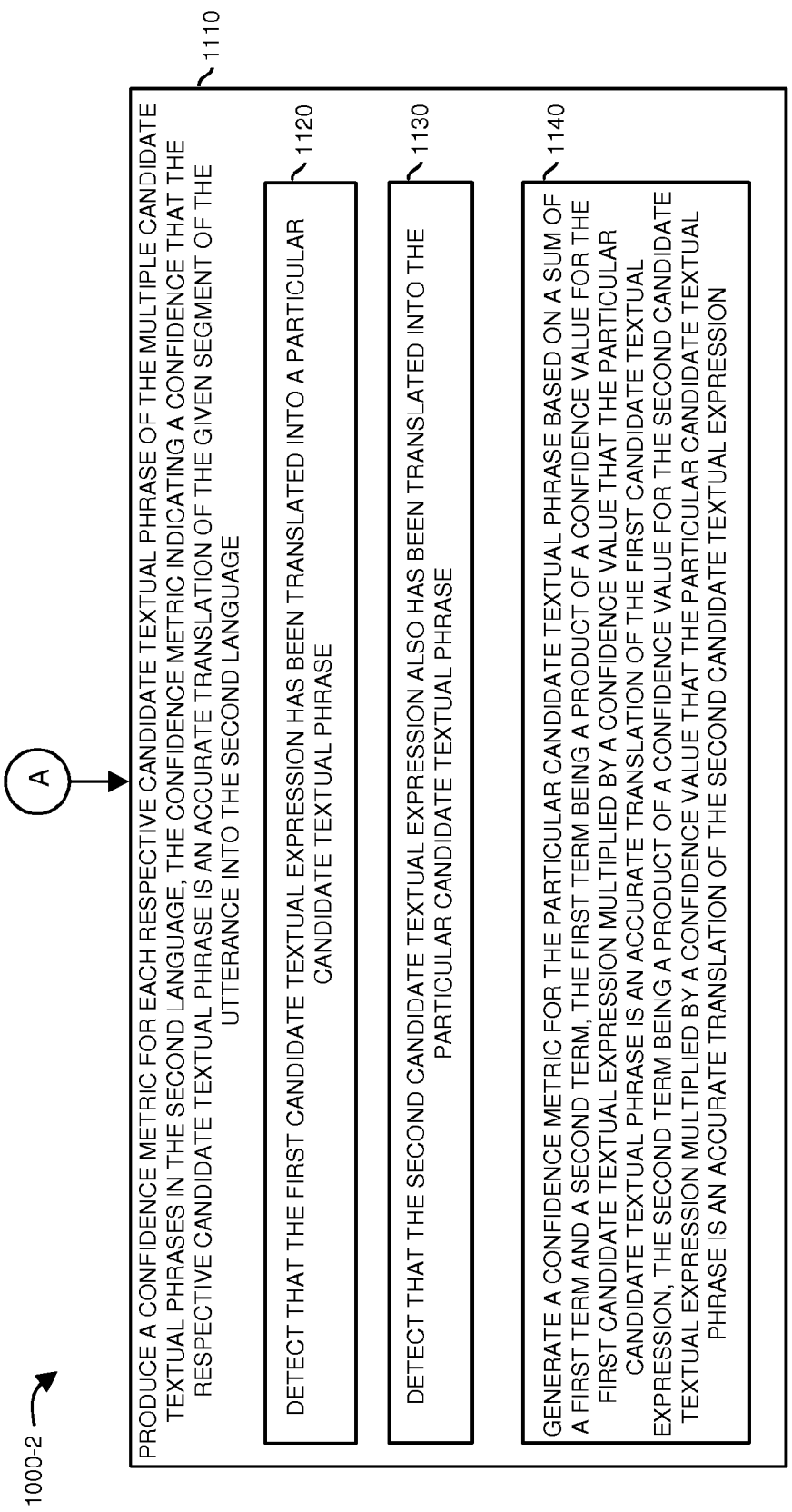

FIGS. 10 and 11 combine to form a flowchart 1000 (e.g., flowchart 1000-1 and flowchart 1000-2) illustrating implementation of a multi-stage translation system according to embodiments herein.

In step 1010, the speech-processing system 100 receives an utterance 105 spoken in a first language.

In step 1020, the speech-processing system 100 partitions a spoken sentence in the utterance 105 into multiple segments 120, a given segment 120-1 of the multiple segments includes one or more words spoken in the first language.

In step 1030, the speech-processing system 100 performs a speech-to-text translation of the given segment 120-1 into a set of candidate textual expressions in the first language. The set of candidate textual expressions can include candidate textual phrase 140-1 and candidate textual phrase 140-2.

In step 1040, the speech-processing system 100 produces confidence values 145 for each of the candidate textual phrases in the first language In step 1050, for each respective candidate textual phrases 140-1 and 140-2, the speech-processing system 100 performs a language translation of the respective candidate textual phrase into one or more candidate textual phrases. For example, the speech-processing system 100 translates candidate textual phrase 140-1 into phrase A1 and phrase B. The speech-processing system 100 translates candidate textual phrase 140-2 into phrase A2 and phrase C.

In step 1060, the speech-processing system 100 produces a confidence value for each of the candidate textual phrases 160 in the second language.

In step 1110 of flowchart 1000-2 (FIG. 11), the speech-processing system 100 produces a confidence metric for each respective candidate textual phrase of the multiple candidate textual phrases 160 in the second language, the confidence metric indicating a confidence that the respective candidate textual phrase is an accurate translation of the given segment of the utterance into the second language.

In sub-step 1120, the speech-processing system 100 detects that the first candidate textual phrase 140-1 has been translated into a particular candidate textual phrase such as phrase A.

In step 1130, the speech-processing system 100 detects that the second candidate textual phrase 140-2 also has been translated into the particular candidate textual phrase such as phrase A.

In step 1140, the speech-processing system 100 generates a confidence metric for the particular candidate textual phrase A based on a sum of a first term and a second term, the first term being a product of a confidence value (e.g., CV10) for the first candidate textual phrase 140-1 multiplied by a confidence value (e.g., CV20) that the particular candidate textual phrase A is an accurate translation of the first candidate textual phrase 140-1, the second term being a product of a confidence value (e.g., CV11) for the second candidate textual phrase 140-2 multiplied by a confidence value (e.g., CV22) that the particular candidate textual phrase A is an accurate translation of the second candidate textual phrase 140-2.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
  performing, by computer processing hardware, operations of:
    receiving an utterance spoken in a first language;
    partitioning a spoken sentence in the utterance into multiple segments, a given segment of the multiple segments including multiple words spoken in the first language;
    converting the given segment of the multiple segments into multiple candidate textual phrases in a second language, further comprising:

performing a speech-to-text translation of the given segment into a set of candidate textual expressions in the first language by translating the given segment into at least a first candidate textual expression and a second candidate textual expression in the first language; and wherein performing the language translation includes:

identifying that the first candidate textual expression translates into a first candidate textual phrase and a second candidate textual phrase; and identifying that the second candidate textual expression translates into a third candidate textual phrase and a fourth candidate textual phrase, the first candidate textual phrase being identical to the third candidate textual phrase; and for each respective candidate textual expression in the set;

performing a language translation of the respective candidate textual expression into multiple candidate textual phrases in the second language;

producing a confidence metric for each respective candidate textual phrase of the multiple candidate textual phrases in the second language, the confidence metric indicating a confidence that the respective candidate textual phrase is an accurate translation of the given segment of the utterance into the second language;

producing a confidence value for each of the candidate textual expressions in the first language;

producing a confidence value for each of the candidate textual phrases in the second language; and generating a confidence metric for the first candidate textual phrase based on a sum of a first term and a second term, the first term being a product of a confidence value for the first candidate textual expression multiplied by a confidence value for the first candidate textual phrase, the second term being a product of a confidence value for the second candidate textual expression multiplied by a confidence value for the third candidate textual phrase.

2. The method as in claim 1 further comprising:

producing the confidence metrics based on a sum of products of confidence values associated with translations of the given segment into candidate textual expressions in the first language and confidence values associated with translations of the candidate textual expressions into the candidate textual phrases in the second language.

3. The method as in claim 2, wherein the candidate textual phrases in the second language are derived from the candidate textual expressions in the first language.

4. The method as in claim 1, wherein each of the first candidate textual phrase, the second candidate textual phrase, and the fourth candidate textual phrase are unique with respect to each other.

5. The method as in claim 1, wherein partitioning the spoken sentence in the utterance comprises producing the given segment to include a phrase of multiple words in the first language but fewer than all words spoken in the sentence.

6. The method as in claim 1, wherein the confidence metric indicates a degree to which the respective candidate textual phrase in the second language is a best candidate translation of the given segment of the utterance into the second language.

7. A method comprising:

performing, by computer processing hardware, operations of:

parsing an uttered sentence into segments;

translating each of the segments into candidate textual expressions in a first language;

translating each of the candidate textual expressions into candidate textual phrases in a second language; and producing, based at least in part on a product of confidence values associated with the candidate textual expressions in the first language and confidence values associated with the candidate textual phrases in the second language, a confidence metric for each of the candidate textual phrases in the second language, producing the confidence metric including:

executing separate translation paths in which a given segment of the utterance translates into a common candidate textual phrase in the second language, the separate translation paths including a first translation path and a second translation path;

the first translation path including: a translation of the given segment of the utterance into a first candidate textual expression in the first language and a subsequent translation of the first candidate textual expression in the first language to the common candidate textual phrase in the second language; and the second translation path including: a translation of the given segment of the utterance into a second candidate textual expression in the first language and a subsequent translation of the second candidate textual expression in the first language to the common candidate textual phrase in the second language.

8. The method as in claim 7 further comprising:

producing a respective confidence metric of translating the given segment of the utterance in the first language into the common candidate textual phrase in the second language based on a sum of a first product and a second product, the respective confidence metric indicating a confidence that the common candidate textual phrase in the second language is an accurate translation of the given segment of the utterance in the first language;

producing a first confidence value, the first confidence value indicating a respective confidence that the first candidate textual expression is an accurate translation of the given segment of the utterance;

producing a second confidence value, the second confidence value indicating a respective confidence that the common candidate textual phrase in the second language is an accurate translation of the first candidate textual expression;

producing a third confidence value, the third confidence value indicating a respective confidence that the second candidate textual expression is an accurate translation of the given segment of the utterance;

producing a fourth confidence value, the fourth confidence value indicating a respective confidence that the common candidate textual phrase in the second language is an accurate translation of the second candidate textual expression;

the first product generated via multiplication of the first confidence value by the second confidence value; and the second product generated via multiplication of the third confidence value by the fourth confidence value.

\* \* \* \* \*